US008634408B2

(12) United States Patent
Almalki et al.

(10) Patent No.: US 8,634,408 B2
(45) Date of Patent: Jan. 21, 2014

(54) SINGLE SLOT DTM FOR SPEECH/DATA TRANSMISSION

(75) Inventors: Nazih Almalki, Waterloo (CA); Christopher Harris Snow, Kitchener (CA); Ayman Ahmed Abdel-Samad, Waterloo (CA); Dinesh Kumar Arora, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 886 days.

(21) Appl. No.: 12/631,390

(22) Filed: Dec. 4, 2009

(65) Prior Publication Data
US 2011/0134908 A1    Jun. 9, 2011

(51) Int. Cl.
*H04L 12/66* (2006.01)

(52) U.S. Cl.
USPC .......................................................... 370/352

(58) Field of Classification Search
None
See application file for complete search history.

(56) References Cited

U.S. PATENT DOCUMENTS

| | | | | |
|---|---|---|---|---|
| 6,282,182 B1 * | 8/2001 | Pecen et al. | ................... | 370/336 |
| 7,804,827 B2 | 9/2010 | Vallstrom et al. | | |
| 2002/0002050 A1 * | 1/2002 | Rinne et al. | ..................... | 455/434 |
| 2002/0009101 A1 * | 1/2002 | Niemela | ........................ | 370/523 |
| 2002/0136242 A1 * | 9/2002 | Niemela | ........................ | 370/523 |
| 2003/0012175 A1 * | 1/2003 | Sebire | ............................ | 370/347 |
| 2004/0120302 A1 | 6/2004 | Sebire et al. | | |
| 2006/0068814 A1 * | 3/2006 | Cheng et al. | .................. | 455/466 |
| 2007/0002823 A1 * | 1/2007 | Skov Andersen et al. | ..... | 370/349 |
| 2008/0058004 A1 * | 3/2008 | Gonorovsky et al. | ....... | 455/552.1 |
| 2009/0323588 A1 * | 12/2009 | Aghili et al. | .................. | 370/328 |
| 2010/0067440 A1 * | 3/2010 | Dick et al. | ..................... | 370/328 |
| 2010/0304706 A1 * | 12/2010 | Haverty | ...................... | 455/404.1 |
| 2011/0051660 A1 | 3/2011 | Arora et al. | | |
| 2012/0178358 A1 * | 7/2012 | Haverty | ............................ | 455/1 |

FOREIGN PATENT DOCUMENTS

WO    01/61899    8/2001

OTHER PUBLICATIONS

International Searching Authority, International Search Report and Written Opinion issued in PCT/IB2010/003089, mailed Apr. 29, 2011, 7 pages.

* cited by examiner

*Primary Examiner* — Suk Jin Kang
(74) *Attorney, Agent, or Firm* — Hanley, Flight & Zimmerman LLC

(57) ABSTRACT

The present document relates to radio transmission. In particular, the present document relates to the single-slot dual transfer mode (DTM) available e.g. in GSM/GPRS/GERAN networks. A transmitter is described. The transmitter is configured to send circuit switched data over a traffic channel to a corresponding receiver, wherein the traffic channel is segmented into a plurality of frames. The transmitter if further configured to determine a vacant frame of the plurality of frames, wherein no circuit switched data is sent in the vacant frame due to discontinuous transmission; and to send packet switched data over the traffic channel using the vacant frame.

26 Claims, 6 Drawing Sheets

SINGLE SLOT DTM FOR SPEECH/DATA TRANSMISSION

TECHNICAL FIELD

The present document relates to radio transmission. In particular, the present document relates to the single-slot dual transfer mode (DTM) available e.g. in GSM/GPRS/GERAN networks.

BACKGROUND

DTM is a GERAN (GSM EDGE Radio Access Network) feature which allows for simultaneous circuit-switched (CS) voice and packet-switched (PS) data transfers. Two sub-classes of DTM are
multi-slot DTM, where voice and data traffic is carried on separate timeslots, and
single-slot DTM, where a combination of a half-rate speech traffic channel and a half-rate packet data channel is carried on the same timeslot. This is described in the document 3GPP TS 45.002 which is incorporated by reference.

Single-slot DTM is advantageous in congested cells, in which there are not sufficient free timeslots for a multi-slot allocation but in which Mobile Stations (MS), also referred to as user equipment and wireless devices, still require simultaneous voice and data transfer. In particular, DTM is highly useful for combined telephony and data devices in order to maintain an "always on, always connected" experience. On the other hand, a disadvantage of single-slot DTM as currently specified in GERAN is that it can only be used in combination with half-rate speech. This implies that the use of single-slot DTM will typically result in lower speech quality.

BRIEF DESCRIPTION OF THE FIGURES

The disclosure is explained below in an illustrative manner with reference to the accompanying drawings, wherein.

DETAILED DESCRIPTION

Figure 1:
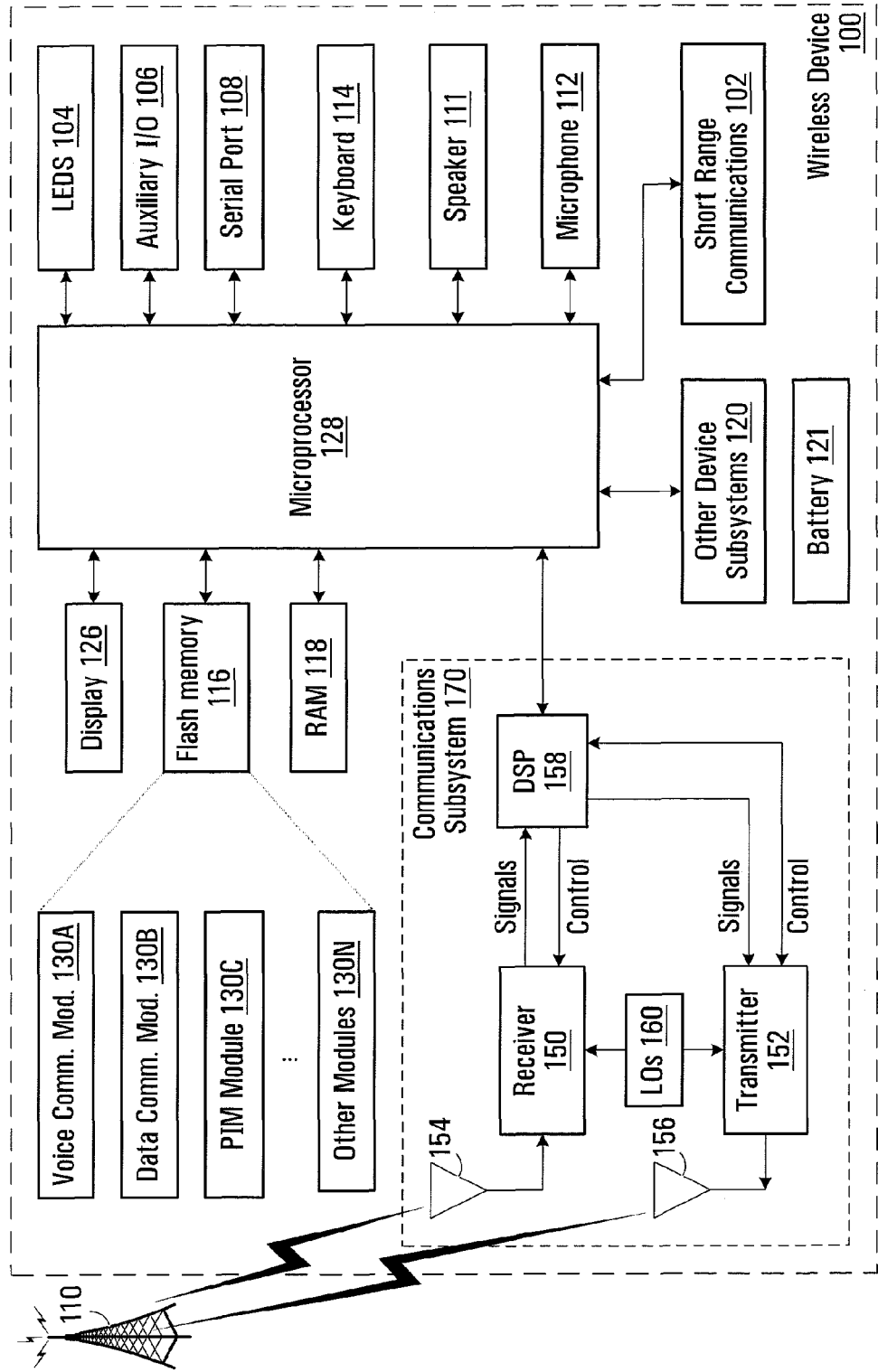
FIG. 1 is a block diagram of an example implementation of a mobile station.

In the present document a new type of single-slot DTM operation is described, which allows simultaneous speech and data transfer, i.e. simultaneous CS and PS data transfer. The proposed single-slot DTM may be operated in connection with full-rate and/or half-rate speech channels. When full-rate speech channels are used, the new type of single slot DTM avoids the speech quality degradation inherent in half-rate speech, while still allowing the transmission of PS data traffic. When half-rate speech channels are used, the proposed DTM scheme may be used to further increase the capacity of congested cells, while maintaining the half-rate speech quality.

According to an aspect, a transmitter, e.g. a GERAN transmitter, is described. The GERAN transmitter may be configured to send circuit switched data over a traffic channel to a corresponding GERAN receiver. The traffic channel may be segmented into a plurality of frames. In an embodiment, the traffic channel may be a half rate traffic channel or a full rate traffic channel. The traffic channel may be associated with a single time slot of a radio channel. In an embodiment, the radio channel has the Absolute Radio Frequency Channel Number C0.

In the context of GERAN, a radio channel is typically sub-divided into a plurality of time slots using time—multiplexing, i.e. TDMA (Time Divisional Multiple Access). By way of example, 8 time slots may be comprised within a radio channel. A radio channel may be sub-divided into a sequence of frames, wherein a plurality of frames may be grouped into so-called multiframes. Each frame may comprise 8 time slots, wherein the physical content of a time slot, i.e. a sequence of symbols, is typically referred to as a burst. A traffic channel typically uses a time slot of the frames of a radio channel to transmit traffic data, e.g. circuit switched data or packet switched data, between a GERAN transmitter and a GERAN receiver. In conventional GERAN systems, a particular traffic channel is reserved for the transmission of either circuit switched data or packet switched data between a GERAN transmitter and a corresponding GERAN receiver. In a full-rate traffic channel a particular time-slot of approx. all frames, excluding frames which are used for the transmission of control information, may be reserved for the transmission of a particular data type, whereas in a half-rate traffic channel a particular time-slot of approx. half of the frames, excluding frames which are used for the transmission of control information, may be reserved for the transmission of a particular data type.

The circuit switched data may comprise audio data and/or a silence descriptor message, i.e. the circuit switched data may be associated with an audio communication, e.g. a speech communication. In the case of audio transmission, discontinuous transmission may be used, i.e. during silence periods of an audio signal, no or a reduced amount of circuit switched data may be sent over the traffic channel. In such cases, silence descriptor (SID) messages may be sent within selected frames of the traffic channel in order to provide the corresponding receiver with information regarding background noise. Other frames of the traffic channel may remain idle.

The packet switched data may comprise data transmitted over a packet switched network. This may comprise electronic mail messages, WEB content, etc.

The GERAN transmitter may further be configured to determine a vacant frame of the plurality of frames; wherein no circuit switched data is sent in the vacant frame due to discontinuous transmission. As outlined above, during silence periods of the circuit switched data, the traffic channel may use discontinuous transmission, whereby during a subset of the plurality of frames of a traffic channel nothing is transmitted. Such vacant frames may be identified by the GERAN transmitter, e.g. through the inspection of the circuit switched data and/or through signaling received from an encoder of the circuit switched data.

The transmitter may further be configured to send packet switched data over the traffic channel using the vacant frame. In other words, a vacant frame of a traffic channel which is used for the transmission of circuit switched data during periods of speech activity may be used for the transmission of packet switched data during silence periods.

Furthermore, the transmitter may be configured to set an identifier of the vacant frame to inform the corresponding GERAN receiver that the vacant frame comprises packet switched data. The vacant frame may comprise a plurality of payload symbols or payload bits. In such cases, the identifier may correspond to a subset of the payload symbols or payload bits. In particular, the payload symbols or payload bits may comprise one or more stealing symbols or stealing bits, and the identifier may correspond to the one or more stealing symbols or stealing bits. In an embodiment, the set identifier makes the vacant frame appear to be a Fast Associated Control Channel (FACCH) frame. Typically this is the case if the one or more stealing symbols or stealing bits are set to "1" for the set identifier.

The transmitter may be configured to encode a conventional FACCH fame, i.e. a FACCH frame comprising FACCH data, with a first forward error correction (FEC) code; and/or to encode the FACCH frame which comprises packet-switched data, i.e. a frame which only appears to be a FACCH frame, with a second FEC code. In an embodiment the first and the second FEC code are different.

The transmitter may be configured to perform a first cyclic redundancy check (CRC) on the conventional FACCH frame and/or a second redundancy check on the FACCH frame which comprises packet-switched data. The cyclic redundancy check may be performed prior to the first or second FEC encoding, respectively. The CRC checksum may be appended to the FACCH frame and the FEC encoding may be performed on the FACCH frame comprising the CRC checksum. The first and second CRC may use the same CRC divisor.

The radio channel may be modulated using one of the modulation schemes GMSK or 8PSK. Typically for GMSK modulated radio channels a payload symbol of a frame or burst comprises one bit, whereas for 8PSK modulated radio channels a payload symbol comprises three bits. In the context of a GMSK modulated radio channel, the traffic channel may be encoded using e.g. one of the encoding schemes: CS-1, CS-2, CS-3, CS-4, MCS-1, MCS-2, MCS-3, MCS-4 or AMR (Adaptive Multirate) encoding schemes. In the context of a 8PSK modulated radio channel, the traffic channel may be encoded using e.g. one of the encoding schemes: MCS-5, MCS-6, MCS-7, MSC-8 or MCS-9.

According to a further aspect, a GERAN receiver is described. The receiver may be configured to receive circuit switched data over a traffic channel from a corresponding GERAN transmitter; wherein the traffic channel is segmented into a plurality of frames. The GERAN receiver may further be configured to extract an identifier comprised within a frame of the plurality of frames. In particular, the receiver may be configured to identify an identifier as outlined above. Using the extracted identifier, the receiver may be configured to determine that the frame comprises packet switched data, wherein the frame is a vacant frame associated with discontinuous transmission of the traffic channel.

In an embodiment, the identifier makes the frame appear to be a Fast Associated Control Channel (FACCH) frame. The receiver may be configured to perform a first cyclic redundancy check to verify if the frame comprises FACCH data. Such FACCH data is typically handled by the receiver in a conventional way. Alternatively or in addition, the receiver may be configured to perform a second cyclic redundancy check to verify if the frame comprises packet switched data. The first cyclic redundancy check may be executed after decoding of the frame using the first forward error correction code. The second cyclic redundancy check may be executed after decoding of the frame using the second forward error correction code.

According to another aspect, a mobile station is described, wherein the mobile station may comprise a transmitter comprising any of the aspects and/or features outlined in the present document. Alternatively or in addition, the mobile station may comprise a receiver comprising any of the aspects and/or features outlined in the present document.

The mobile station may be configured to inform a corresponding base station about its capability regarding the communication of packet switched data during discontinuous transmission of circuit switched data. This may be done e.g. by informing the corresponding base station using a field in a Mobile Station Classmark 3 message and/or by informing the corresponding base station by means of a Channel Request Description 2 information element.

According to a further aspect, a base station is described, wherein the base station may comprise a transmitter comprising any of the aspects and/or features outlined in the present document. Alternatively or in addition, the base station may comprise a receiver comprising any of the aspects and/or features outlined in the present document.

The base station may be configured to inform a corresponding mobile station about its capability regarding the communication of packet switched data during discontinuous transmission of circuit switched data. This may be done e.g. by informing the corresponding mobile station using a DTM Assignment Command message and/or by informing the corresponding mobile station by signaling a combination of a full-rate circuit switched data traffic channel and a single-slot packet switched data traffic channel assignment.

The base station may comprise a PS processing unit configured to process packet switched data and a CS processing unit configured to process circuit switched data. The base station may be configured to pass a frame comprising packet switched data from the CS processing unit to the PS processing unit. In particular, the base station may be configured to receive a plurality of frames associated with a traffic channel for circuit switched data. If the base station determines that a frame of the plurality of frames comprises packet switched data, the frame may be forwarded to the PS processing unit. In an embodiment, the base station is configured to inspect a plurality of frames received from another network element. The another network element could be a mobile switching center. The base station may be operable to identify a vacant frame within the plurality of frames, wherein the vacant frame is associated with discontinuous transmission.

According to another aspect, a radio interface for a GERAN is described, wherein the radio interface specifies a traffic channel for the communication of circuit switched data. In an embodiment, the radio interface may be a Um interface comprising any of the aspects/features described herein. The traffic channel may be segmented into a plurality of frames and a vacant frame associated with discontinuous transmission may be used for the communication of packet switched data.

According to a further aspect, a radio signal is described. The radio signal is associated with a traffic channel of a GERAN for the communication of circuit switched data. The traffic channel may be segmented into a plurality of frames, and a vacant frame associated with discontinuous transmission may be used for the communication of packet switched data.

According to another aspect, a method for transmitting circuit switched data and packet switched data over a traffic channel of a GERAN is described. The method may comprise: transmitting circuit switched data over the traffic channel; wherein the traffic channel is segmented into a plurality of frames; determining a vacant frame of the plurality of frames; wherein no circuit switched data is sent in the vacant frame due to discontinuous transmission; and/or transmitting packet switched data over the traffic channel using the vacant frame.

According to a further aspect a method for receiving circuit switched data and packet switched data over a traffic channel of a GERAN is described. The method may comprise receiving circuit switched data over the traffic channel; wherein the traffic channel is segmented into a plurality of frames; extracting an identifier comprised within a frame of the plurality of frames; and/or determining that the frame comprises packet switched data by using the extracted identifier; wherein the frame is a vacant frame associated with discontinuous transmission of the traffic channel.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner, such as features explicitly disclosed in relation to a base station are applicable to a corresponding mobile station as well.

Figure 2:
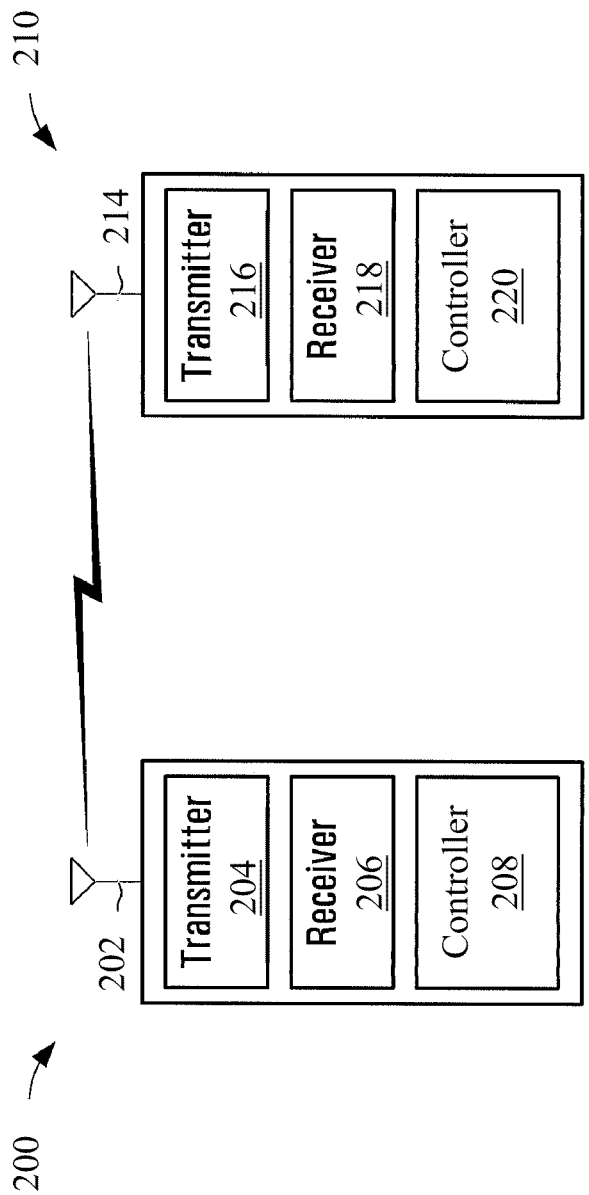
FIG. 2 is a block diagram of an example mobile station and an example base station.

FIGS. 1 and 2 illustrate example implementations of a mobile station and a wireless network (i.e. base station), respectively, within which the aspects and features described in the present document, notably the proposed DTM schemes, may be implemented. The Figures will be described in detail at a later section of this document.

The document 3GPP TS 45.001 "Physical layer on the radio path; General description" describes among other things the frame and time slot structure used in GSM. This document is incorporated by reference. The access scheme in GSM uses Time Division Multiple Access (TDMA) with eight time slots per carrier. A diagrammatic representation of an excerpt of the time frame structures is shown in FIG. 3.

The longest recurrent time period of the structure is called a hyperframe 321. One hyperframe 321 is subdivided in 2048 superframes 322. The superframe 322 is itself subdivided in multiframes 323. Four types of multiframes 323 exist in the system defined in the above mentioned document 3GPP TS 45.001 of which one is shown in FIG. 3. The shown multiframe 323 which is also referred to as "26-frame multiframe" comprises 26 TDMA frames 324 and has a duration of 120 ms. The TDMA frames are numbered modulo the hyperframe 321, i.e. the TDMA frame numbers (FN) go from 0 to 2 715 647. As can be seen in FIG. 3, the TDMA frame 324 comprises eight time slots 325. The time slot 325 typically represents a time interval of $15/26$ ms and its physical content is called a burst. The normal burst 326 (NB), which is illustrated in FIG. 3, is used to carry the information for traffic and control channels. It comprises 116, i.e. 58 plus 58, encrypted or unencrypted symbols 330, which can also be referred to as payload symbols 330 (shown as payload bits in FIG. 3). Typically, each set of symbols 330 comprises two so called stealing symbols, which are placed one on each side of the training sequence symbols 331 shown in FIG. 3 and which are used at the receiver to distinguish between control and traffic payload. In particular, the stealing symbols can be used to distinguish between a FACCH (Fast Associated Control Channel) and a TCH, i.e. a traffic channel, wherein the FACCH is typically used for in-call signaling, including call disconnect, handover and the later stages of call setup. Furthermore, the burst 326 comprises 26 training sequence symbols 331 used to train the equalizer settings at the respective radio receiver, i.e. the Mobile Station (MS) or the Base Station (BS) or Base Transceiver Station (BTS), respectively. In addition, the burst 326 may comprise tail symbols and a guard period.

Figure 3:
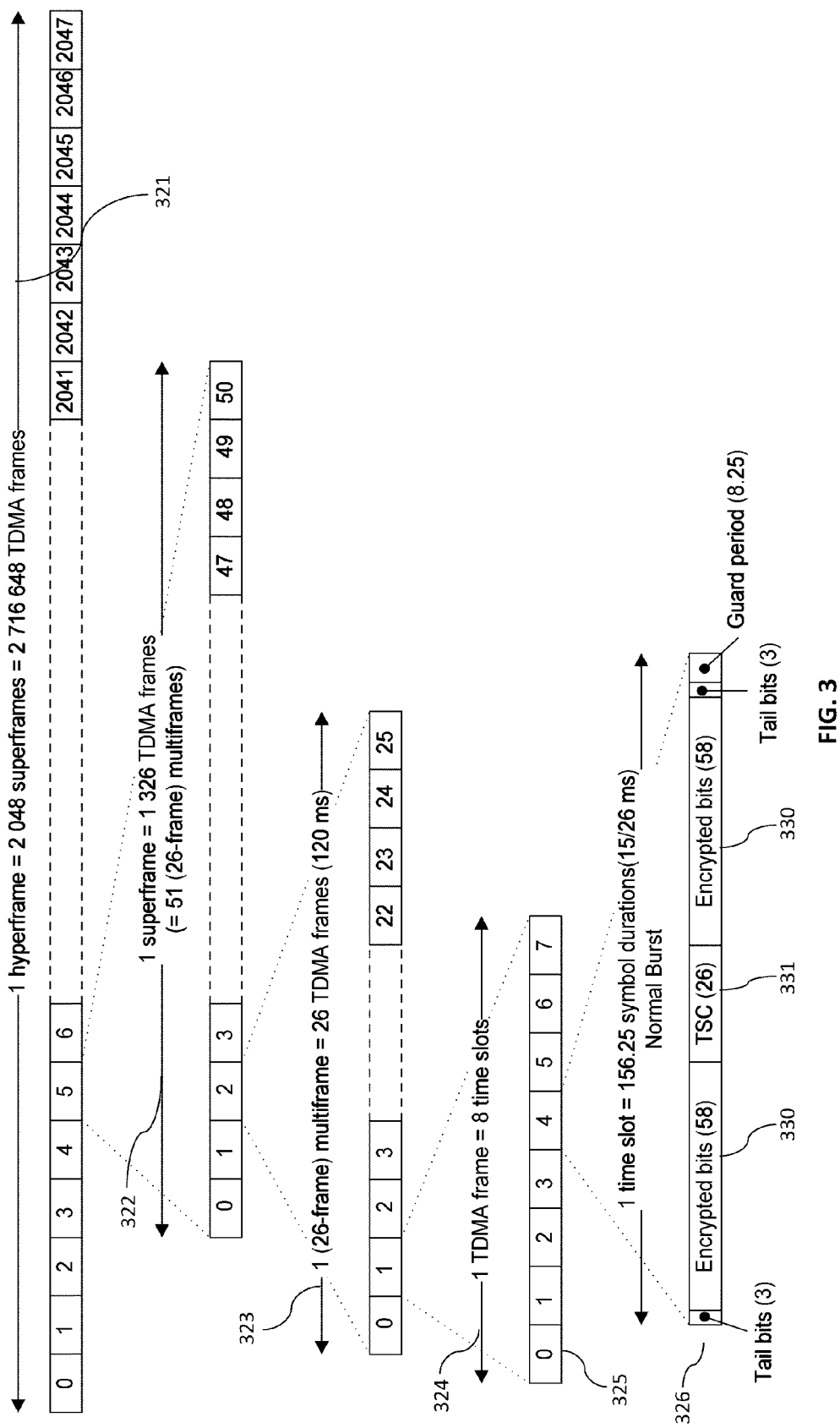
FIG. 3 illustrates an example frame, timeslot and bust structure of GSM.

It should be noted that the burst 326 shown in FIG. 3 typically comprises payload symbols. Depending on the underlying modulation scheme, these symbols may carry one bit, as is the case for GMSK modulated transmission, or several bits, as is the case for 8PSK modulated transmission.

Figure 4:
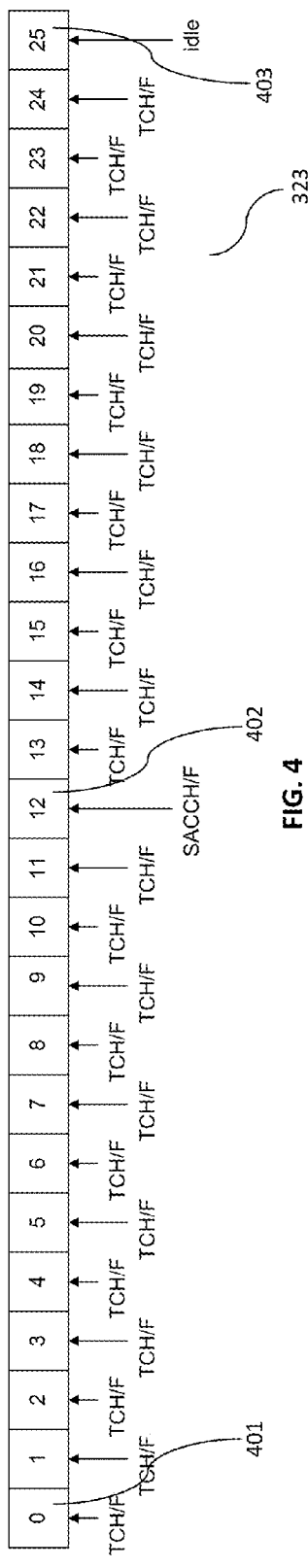
FIG. 4 illustrates an example TDMA frame mapping for TCH/F and SACCH/F.
Figure 5:
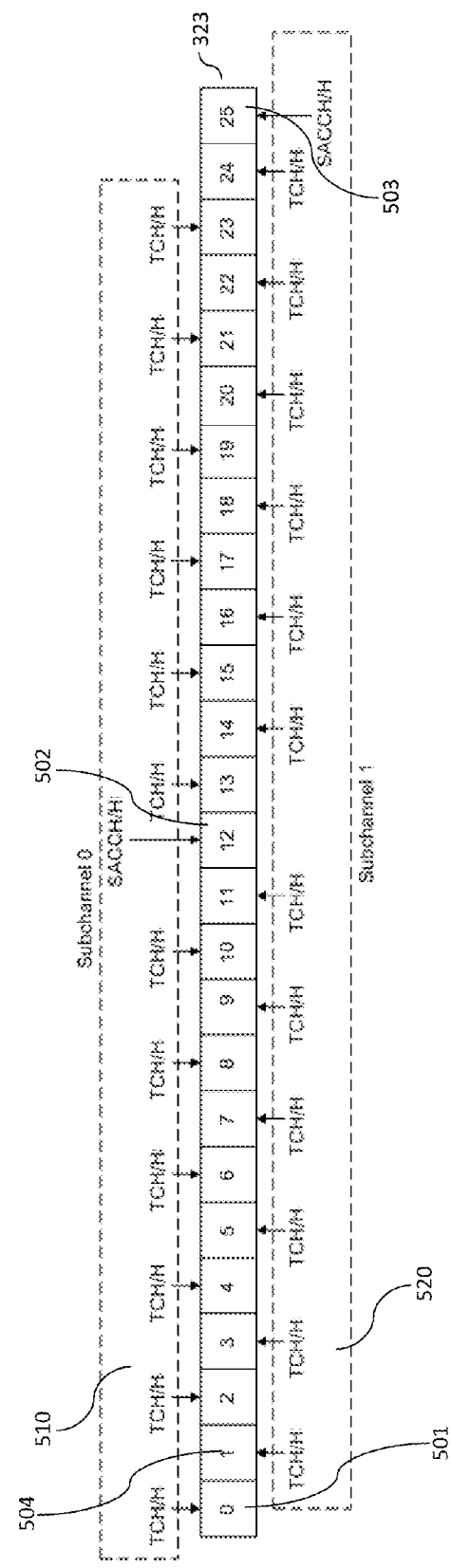
FIG. 5 shows an example TDMA frame mapping for TCH/H and SACCH/H, for the subchannels 0 and 1.

In the following, it is outlined how speech and data traffic is mapped into a time slot 325 of a TDMA frame 324 or more specifically into a time slot 325 of a multiframe 323. TDMA frame mapping is specified in the document 3GPP TS 45.002 "Multiplexing and multiple access on the radio path", which is incorporated by reference. FIGS. 4 and 5 depict the mapping of traffic channels for full rate speech/data and half rate speech/data together with the associated control channels on a (26-frame) multiframe 323. It should be noted that in the present document the term "speech" is used as an embodiment of the general term "CS data", whereas the term "data" is used as an embodiment for the general term "PS data".

In FIG. 4, it can be seen that the TDMA frames 0 to 11 and 13 to 24 are used for full rate speech/data traffic. The reference sign 323 identifies an example TDMA multiframe. In FIG. 4, the full rate speech/data frames are referred to as TCH/F, i.e. as traffic channels for full rate speech/data. So called full rate channels typically assign one time slot of a TDMA frame to one speech or data connection. The speech data may be encoded at bit-rates up to 14 kbit/s wherein the remaining channel bit-rate is typically used for channel coding (e.g. Forward Error Correction), etc. The bit-rates for data depend on the coding schemes used. GPRS uses four coding schemes (CS-1 to 4) while EDGE uses nine Modulation and Coding Schemes (MCS-1 to 9). The possible bit-rates for the transmission of PS data in a full-rate channel are listed in Table 1.

TABLE 1

| Modulation and Coding Scheme (MCS) | Bandwidth (kbit/s/time slot) | Modulation |
|---|---|---|
| CS-1 | 8.0 | GMSK |
| CS-2 | 12.0 | GMSK |
| CS-3 | 14.4 | GMSK |
| CS-4 | 20.22 | GMSK |
| MCS-1 | 8.80 | GMSK |
| MCS-2 | 11.2 | GMSK |
| MCS-3 | 14.8 | GMSK |
| MCS-4 | 17.6 | GMSK |
| MCS-5 | 22.4 | 8-PSK |
| MCS-6 | 29.6 | 8-PSK |
| MCS-7 | 44.8 | 8-PSK |
| MCS-8 | 54.4 | 8-PSK |
| MCS-9 | 59.2 | 8-PSK |

The coding schemes differ in their robustness, wherein the less robust coding schemes providing higher bandwidth are typically available near base transceiver stations (BTS) and the more robust coding schemes, providing lower bandwidth, are still available when the MS is at further distances to the BTS.

As shown in FIG. 4, the TDMA frame with frame number 12, identified by reference number 402, is assigned to carry control information for the traffic channel. This control channel is referred to as the Slow Associated Control Channel (SACCH) for full rate speech/data traffic (F), SACCH/F. Its normal function is to carry system information messages from the respective transmitter to the respective receiver; and to carry receiver measurement reports and to perform closed-loop power and timing control from the respective receiver to the respective transmitter. As full rate speech/data channels TCH/F typically only require one SACCH/F channel, TDMA frame 25 remains idle. This idle frame is identified by reference sign 403.

FIG. 5 illustrates the mapping of traffic channels (TCH) at half rate speech/data (H) to the TDMA frames of the multiframe 323. Half rate systems typically assign succeeding TDMA frames to two one-to-one speech connections in an alternating manner. By doing this, two separate subchannels are defined, referred to as subchannel 0 (reference sign 510) and subchannel 1 (reference sign 520). In other words, the TDMA frames with even numbers (e.g. TDMA frame 501) are assigned to subchannel 0 and the TDMA frames with uneven numbers (e.g. TDMA frame 504) are assigned to subchannel 1.

In a similar manner to the full rate speech/data system, a subset of the TDMA frames is used for the traffic channel. These frames are marked as TCH/H in FIG. 5. More precisely, all TDMA frames of subchannel 0, i.e. all the even TDMA channels, except for TDMA channel 12 (identified by reference sign 502) are used for the transmission of speech/data traffic. In case of subchannel 1, all the uneven TDMA channels, except for TDMA channel 25 (identified by reference sign 503), are used as traffic channels TCH/H.

Due to the fact that half rate channels only use half of the available TDMA frames compared to full rate channels, the bit-rate which is available for speech/data traffic is half the bit-rate of full rate channels. The actual capacity for compressed speech is typically limited to 7 kbit/s in half rate traffic channels. In case of data traffic, the capacity is limited to about half the data rates listed in Table 1.

Dual transfer mode (DTM) may be used to simultaneously transmit speech and data traffic between a MS and a BTS, i.e. to simultaneously transmit CS data and PS data traffic. In the case of single-slot DTM, a combination of a half-rate speech traffic channel and a half-rate packet data channel is carried on the same timeslot. As such, in dual transfer mode a particular time slot 325 of a TDMA frame 324 is selected. For this time slot 325, the half rate traffic channel frames 501 of subchannel 0 may be assigned to CS speech traffic, whereas the half rate traffic channel frames 504 of subchannel 1 may be assigned to PS data traffic. As a consequence, CS speech and PS data traffic may be transmitted alternately within the same time slot in consecutive frames. However, CS speech traffic is transmitted at half the bit rate, which typically has a negative impact on the speech quality.

In case of multi-slot DTM, traffic channels in different time slots are used. A first time slot 325 of the full rate traffic channel frames 401 is assigned to CS speech traffic, wherein a second time slot 325 of the full rate traffic channel frames 401 is assigned to PS data traffic. This mode allows maintaining full rate speech quality, however, it takes up additional network capacity. Consequently, multi-slot DTM may be disfavored in highly congested wireless networks.

In a typical voice/speech call, there are periods of time without speech. These periods are exploited in GSM/GERAN by the use of Discontinuous Transmission (DTX), i.e., frames are skipped if there is no audio content that is to be transmitted. In other words, DTX is a mechanism which allows the radio transmitter to be switched off most of the time during speech pauses for the purpose of saving power in the mobile station (MS) and/or the base station (BS) and reducing the overall interference level on the air interface. Certain aspects of DTX are described in the document 3GPP TS 46.031 "Full rate speech; Discontinuous Transmission (DTX) for full rate speech traffic channels" which is incorporated by reference.

The DTX mechanism typically requires the following functions:
 A voice activity detector (VAD) on the transmit side;
 Evaluation of the background acoustic noise on the transmit side in order to transmit characteristic parameters to the receive side;
 Generation on the receive side of a similar noise, called comfort noise, during periods where radio transmission is cut.

The information on the background noise is transmitted either during a predefined set of TDMA frames (for full rate (FR), half rate (HR) and enhanced full rate speech (EFR) codecs) or at a defined distance from the last speech frame (for adaptive multi rate (AMR) speech codecs). This information is transmitted in so called Silence Descriptor (SID) messages. For FR, HR and EFR codecs this information on background noise (SID) is sent during DTX operation in a predefined set of TDMA frames, which are specified in section 8.3 of the document 3GPP TS 45.008 "Radio subsystem link control". This document is incorporated by reference.

Table 2 shows the mapping of SID frames for FR, HR, and EFR codecs. The frame numbers refer to the frame number in a succession of four multiframes 423, i.e. in a succession of a total of 104 TDMA frames. During DTX operation, no speech traffic is sent on the traffic channel. Only the SACCH frames are used, in order to maintain the signalling and the overall connection. Furthermore, SID information is sent in the TDMA frames listed in Table 2, in order to allow for the generation of comfort noise at the receiver.

TABLE 2

| Type of channel | TDMA frame number (FN) modulo 104 |
|---|---|
| TCH/F | 52, 53, 54, 55, 56, 57, 58, 59 |
| TCH/H, subchannel 0 | 0, 2, 4, 6, 52, 54, 56, 58 |
| TCH/H, subchannel 1 | 14, 16, 18, 20, 66, 68, 70, 72 |

As such, during DTX periods the radio frames 324 are skipped for the particular time slot, as there is no audio content. In other words, during DTX the frames 324 remain idle. These vacant frames 324 may be used to transmit PS data traffic. In other words, modified dual transfer modes are proposed where the PS data traffic is transmitted during DTX periods of the CS speech traffic.

In a first modified dual transfer mode, a full rate channel 401 is assigned to CS speech traffic. During the DTX periods of the full rate channel 401, PS data blocks are transmitted within the vacant frames. This first modified dual transfer mode allows for an increased speech quality compared to a conventional single-slot DTM mode, while maintaining the number of traffic channels used by a particular MS unchanged.

In a second modified dual transfer mode, a half rate channel 501 or 504 is assigned to the CS speech traffic. In a similar manner as outlined above, PS data traffic is transmitted during the DTX periods of the half rate CS speech channel 501 or 504. This second modified dual transfer mode allows maintaining the speech quality of conventional single-slot DTM, while cutting in half the number of traffic channels used by a particular MS. Consequently, the second modified dual transfer mode is particularly useful for highly congested cells.

In an embodiment, whenever there are DTX periods, PS data blocks are transmitted in the vacant frames in a similar fashion as FACCH frames. Alternatively or in addition, PS data blocks may be transmitted in the vacant frames as a subclass of voice. By way of example, for an AMR encoded signal a further subclass could be defined, in addition to a voice frame, a SID frame, etc. In general terms, an indicator in the payload symbols 330, e.g. the stealing symbols, is used to inform the corresponding receiver that PS data traffic instead of CS speech traffic is transmitted within a frame 324. At the receiver, a proposed decoding algorithm will be able to distinguish between frames comprising CS or PS data using the indicator.

It should be noted that in an embodiment the modified DTM schemes are used without an indicator. At the transmitter, the packet switched data is written into a vacant frame during a DTX period of the CS speech traffic. The receiver would be configured to decode the vacant frame comprising PS data under the assumption that the frame comprises CS data (first decoding step). Furthermore, the receiver would be configured to decode the vacant frame comprising PS data under the assumption that the frame comprises PS data, if the first decoding step fails.

In the following, an exemplary embodiment of a transmitter using the proposed modified dual transfer mode is described. The described embodiment makes use of a FACCH to transmit PS data blocks. It should be noted, however, that other indicators may be used, in order to signal to the receiver the transmission of PS data traffic during DTX periods.

Figure 6:
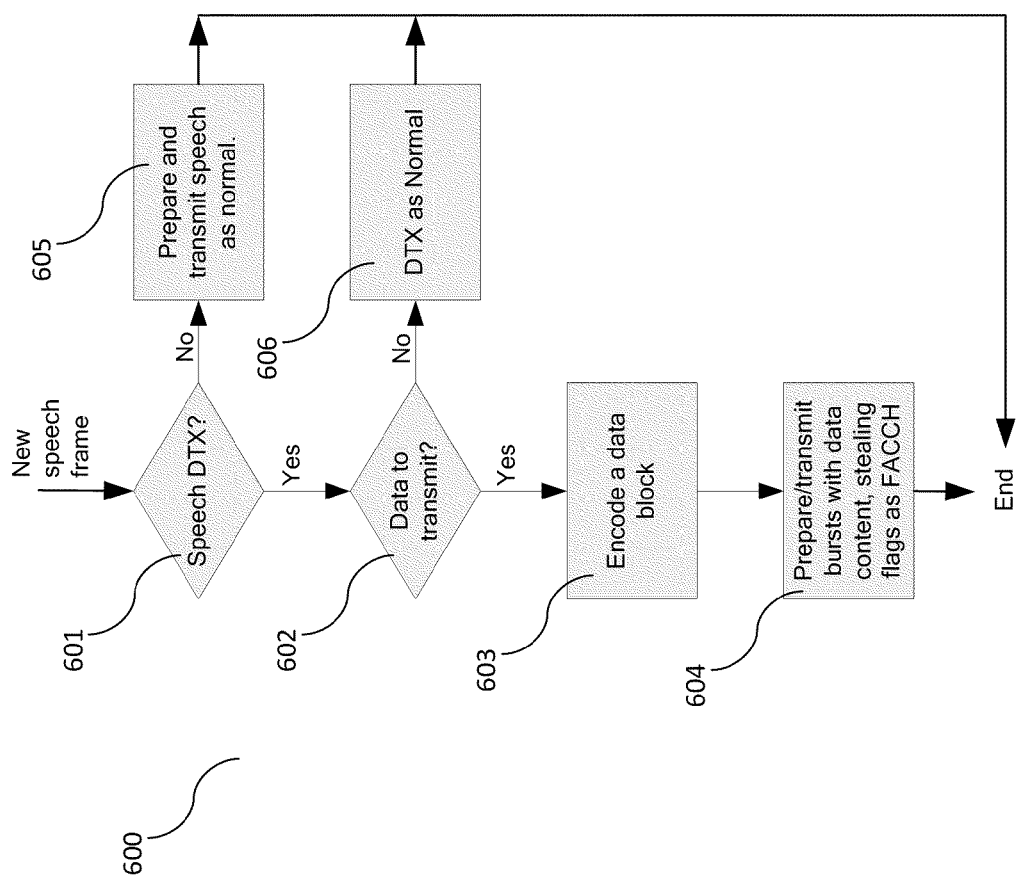
FIG. 6 illustrates an example flow chart of a transmission process of the proposed dual transfer mode.

At the transmitter, the DTX mechanism for speech and the standard EGPRS (Enhanced GPRS, also known as EDGE) procedures from the 3GPP specifications may be inherited with the following modifications. A flow chart illustrating a modified transmission process 600 is shown in FIG. 6. In step 601 it is verified if the speech channel is in a DTX period. If this is not the case, the speech traffic is transmitted in step 605. If the speech channel is in a DTX mode, then it may be checked in an additional step (not shown) if a SID frame needs to be transmitted. If this is the case, then typically the SID frame should have priority over possible PS data traffic. In such cases, the SID frame is transmitted.

However, when a frame of the traffic channel is going to be skipped due to DTX and when data is to be transmitted (step 602), the PS data block is encoded using a specific coding scheme (step 603). Possible coding schemes may be based on the EGPRS channel coding and will be outlined at a later stage.

the stealing flags or stealing symbols of the payload symbols 330 are set to all-ones. This choice of stealing flags makes the PS data frame appear to be a FACCH frame (step 604).

the PS data frame is transmitted as if it was a FACCH frame (step 604).

If, on the other hand, no data is to be transmitted, the traffic channel remains in normal DTX mode (step 606).

The frames transmitted according to the process 600 outlined above may be decoded using the modified reception process 700 outlined in the following. If the received stealing flags indicate that a FACCH frame is received (step 701), the receiver tries to decode the FACCH as normal (step 702). If the FACCH decode fails, i.e. if a bad CRC (cyclic redundancy check) is determined (step 703), then the receiver tries to decode the frame as if it was a PS data frame encoded according to one of the coding schemes described at a later stage (step 704). If the receiver successfully decodes the frame (step 705), i.e. if a good second CRC is determined, then the frame is treated as a usual PS data block (step 708).

In order to distinguish the two CRC determination steps 703 and 705, different FEC codes may be used in case of transmission of a conventional FACCH frame and in case of transmission of a frame comprising PS data. At the corresponding transmitter, the conventional FACCH frame and the frame comprising packet-switched data are encoded using different forward error correction (FEC) codes. At the receiver, FEC decoding of the received frame could be performed under the assumption that the payload data is encoded using a specific encoding scheme, e.g. CS-1, used for frames comprising circuit switched data. In other words, decoding of the received frame is performed using a first FEC code. Subsequently, a cyclic redundancy check is performed to verify if the frame comprises FACCH data. The FEC decoding and the CRC are performed in step 703. If the CRC of step 703 fails, a second FEC decoding is performed assuming that the payload data of the received frame is encoded using a coding scheme for PS data, e.g. MCS-1 to MCS-4. In other words, FEC decoding using a second FEC code is performed. Eventually, a second CRC is performed to see if the frame comprises packet-switched data. The second FEC decoding and the second CRC are performed in step 705.

In the case that some of the above verification steps, i.e. steps 701 to 705, are not successful, alternative actions may be initiated. If the stealing flags do not indicate a FACCH frame (step 701) then the frame is treated as a normal CS speech frame (step 706). If the FACCH decoding step 702/703 did not fail then the frame is treated as a normal FACCH frame (step 707). If the PS data decoding step 704/705 fails then it is typically assumed that a transmission error has occurred.

It should be noted that the proposed DTM schemes may be implemented to be backwards compatible with conventional GERAN receivers. As such, a conventional GERAN receiver which communicates with a corresponding GERAN transmitter, wherein the GERAN transmitter sends PS data during DTX periods of CS data traffic channel, would ignore the PS data and handle the CS data traffic channel as a conventional CS data traffic channel. The transmitter (e.g., mobile station or base station) may determine that the receiver is a conventional receiver because the PS data was ignored. The transmitter may then refrain from sending to the receiver PS data during DTX periods of CS data traffic channel. The transmitter can store an indicator in memory that the receiver is a conventional receiver and/or that transmitter should not attempt to send PS data during DTX periods of CS data traffic channel. This stored indicator may expire after a time period and/or can be updated if the receiver becomes capable of receiving the PS data during DTX periods of CS data traffic channel. Alternatively and/or additionally, if the receiver is capable of receiving the PS data sent during DTX periods of CS data traffic channel, the transmitter (e.g., mobile station of base station) can store an indication of such in memory.

The implementation of the modified dual transfer modes may also require modification of the MS (mobile station) and the BS (base station). In an embodiment, the MS informs the network about its "Improved Single Slot DTM" capability. This can be done by adding a field to the Mobile Station Classmark 3 message (see 3GPP TS 24.008 Section 10.5.1.7 which is incorporated by reference). The added field may take the following form:

Enhanced Single Slot DTM (1 bit field)
This field indicates whether the MS supports enhanced single slot DTM operation. It is coded as follows:
0 Enhanced Single Slot DTM not supported
1 Enhanced Single Slot DTM supported Alternatively or in addition, the capability can be indicated in the Channel Request Description 2 information element (see 3GPP TS 44.018 Section 10.5.2.8b which is incorporated by reference).

The BS may be modified such that the network will inform the MS that "Improved Single Slot DTM" mode of operation is to be used while setting up the MS in DTM mode. In case of the first modified dual transfer mode, this could be done by signalling the combination of a full-rate CS speech channel and a single-slot packet-switched data channel assignment (in the same timeslot as the speech channel) in the DTM Assignment Command message (see 3GPP TS 44.018 Section 9.1.12e which is incorporated by reference). Alternatively or in addition, a new type of DTM assignment to the possible assignments in the DTM Assignment Command message may be specified in order to signal the use of the modified dual transfer modes.

As outlined above, the proposed modified dual transfer modes may require the use of new channel coding and interleaving schemes. The conventional single-slot DTM mode makes use of CS coding schemes outlined in Table 1. In an embodiment, the EGPRS modulation and coding schemes MCS-1 to MCS-4 could be used for the encoding of the PS data blocks in the proposed modified dual transfer mode schemes. Alternatively, new coding/puncturing schemes for the proposed dual transfer mode of operation could be designed. For this purpose, the same mother convolutional code as used in EGPRS could be used for simplicity. Only the puncturing rules would be changed in order to produce codes which operate with the FACCH interleaving, i.e. the 8-frame block diagonal interleaving used on FACCH and CS speech blocks.

In the following, estimates on the performance of the proposed modified dual transfer mode schemes are provided. Based on a typical GERAN traffic channel utilization assumption for speech of 60%, it may be assumed that PS data can be transmitted approximately 40% of the time. In other words, it may be assumed that about 40% of the capacity of a traffic channel used for the transmission of CS speech traffic is available for the transmission of PS data. In Table 3 the achievable throughputs assuming the use of MCS1-MCS4 channel codes are listed.

TABLE 3

| Channel Code | 1-Slot throughput (100% PS data utilization) [bit/s] | 1-Slot throughput (40% PS data utilization) [bit/s] | 1-Slot throughput (40% PS data utilization) [byte/s] |
| --- | --- | --- | --- |
| MCS1 | 8800 | 3520 | 440 |
| MCS2 | 11200 | 4480 | 560 |
| MCS3 | 14800 | 5920 | 740 |
| MCS4 | 17600 | 7040 | 880 |

Based on the throughputs given in Table 3, it can be seen that the proposed scheme can be effective at delivering data such as email messages and instant messaging messages to users, allowing them to send/receive messages while being on a telephone call.

Figure 7:
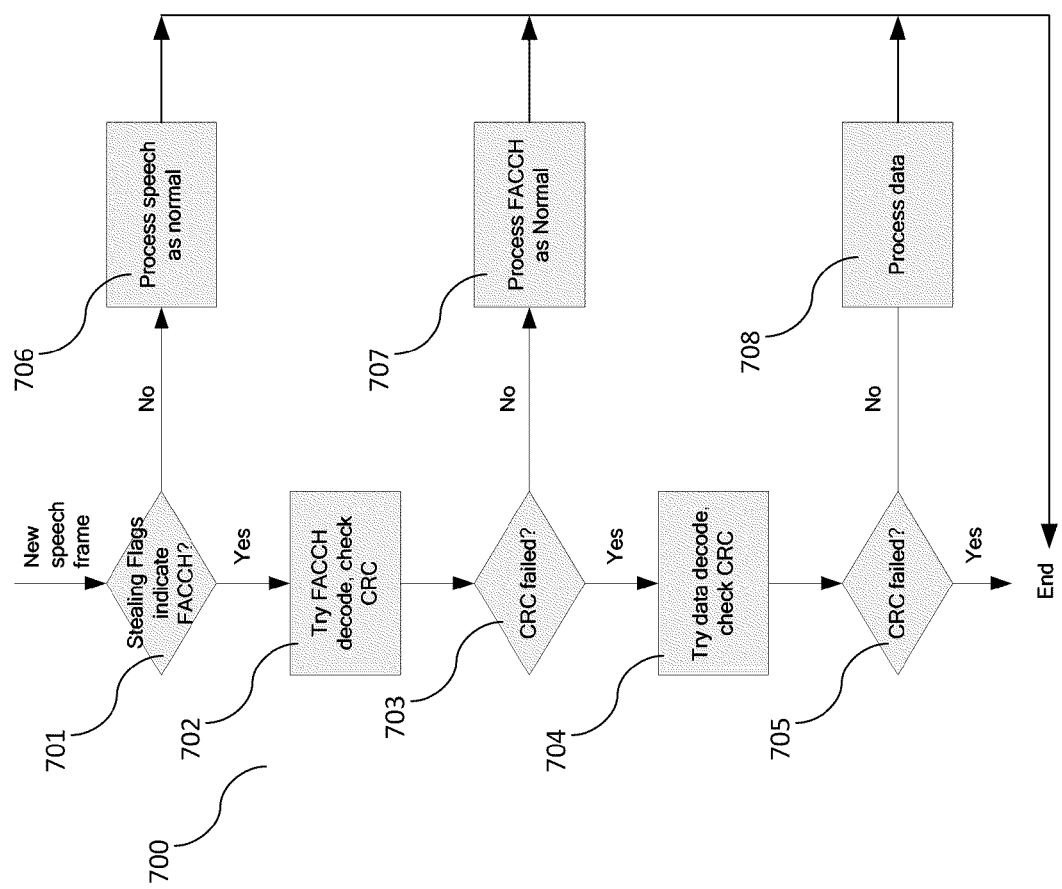
FIG. 7 illustrates an example flow chart of a reception process of the proposed dual transfer mode.

In some of the embodiments of the modified DTM, the FACCH indicator within the payload symbols 330 of a frame is overloaded to denote both FACCH frames and EGPRS data blocks. As a result, there is a possibility that the following scenario may occur: The transmitter sends a normal FACCH frame. However, at the receiver the FACCH decoding fails subject to errors incurred due to bad channel conditions. As an outcome of a failed FACCH decoding, the modified receiver outlined in the context of FIG. 7 tries to decode the received frame as a PS data block (step 704). Theoretically, it is possible that the second CRC is passed even though the frame does not comprise valid PS data.

In a similar manner, it may theoretically be possible that due to the overloading of the FACCH indicator other false detection scenarios occur, e.g., voice confused as data or FACCH, data confused as FACCH or voice, etc. It should be noted, however, that similar false detection scenarios may also occur in conventional GSM/GPRS systems. Furthermore, the likelihood of obtaining a passing CRC on a frame which has incurred errors due to bad channel conditions is small. In addition, it should be noted that a higher-layer protocol may be used to determine that the received data is corrupted and discard the data received within the corrupted frame. The identification of corrupted frames may be implemented by using sequence numbers for the PS data blocks.

In some networks, i.e. in particular in some BS, the entities handling PS traffic and CS traffic are separated. In other words, in some BS implementations the processing and the control of the PS and the CS traffic may be handled by different system components. However, it should be noted that the network, i.e. the BS, knows in advance whether the payload of a burst belongs to a CS or PS traffic stream. As a result, the BS can schedule the resources accordingly. In other words, the BS may analyze the CS and PS data which is to be transmitted and the bursts which are received. Based on such analyzing step, the PS and/or CS processing components within the BS can be scheduled.

If the received PS and CS data on an uplink from a MS is multiplexed on a single timeslot within a single traffic channel, the BS may first feed a received frame to the CS decoder, i.e. to the CS component of the BS, and then forward it to the PS decoder, i.e. the PS component of the BS, in case it is determined that the frame comprises PS data. The forwarding of frames from the CS system component to the PS system component may be implemented via a communication channel between the PS and the CS system component provided within the BS. Such a communication channel may be implemented by upgrading current base station implementations.

In the downlink direction, the BS typically does not have information on whether a traffic channel is in DTX mode or not. The CS component of the BS typically transmits the CS speech traffic frames received from a Mobile Switching Centre (MSC) without considering the transmission of PS data during DTX periods. This issue may be overcome by configuring the BS to derive the information on a possible DTX period by inspecting the data stream coming from the MSC. This would enable the BS to schedule the transmission of PS data blocks during DTX periods.

It should be noted that the proposed modified dual transfer modes are not restricted to specific modulation schemes of the traffic channels. In particular, the proposed modified dual transfer modes are not restricted to GMSK, but may also be used in the context of 8PSK. In other words, full-rate and half-rate 8PSK voice channels (adaptive half rate 8PSK traffic channel for speech (O-TCH/AHS) adaptive full rate 8PSK traffic channel for wideband speech (O-TCH/WFS); adaptive half rate 8PSK traffic channel for wideband speech (O-TCH/WHS)) can use the proposed DTX-based DTM as well. As can be seen from Table 1, the 8PSK based channel coding schemes provide significantly higher throughput than the GMSK based channel coding schemes. In analogy to the GMSK case outlined above, MSC-5 to MSC-9 modulation and coding schemes, or modified version thereof, could be used for the implementation of the modified DTM.

The proposed modified dual transfer modes make use of vacant CS speech frames during DTX periods for the transmission of packet switched (PS) data. As a result, the transmitter maintains its transmission power for the transmission of the PS data, whereas without the transmission of the PS data, the transmitter would typically reduce its transmission power. As a consequence, the interference scenario within a radio cell may be modified.

In GERAN, uplink/downlink physical channel pairs are identified by an index called the ARFCN (Absolute Radio Frequency Channel Number). ARFCNs are defined in GSM Specification 05.05 Section 2 which is incorporated by reference. Within the BS, the ARFCNs are given arbitrary carrier indexes C0 . . . Cn−1, with C0 designated as a Beacon Channel which is always operated at constant power. This means that even during DTX periods, the transmission power of the C0 channel cannot be reduced. In view of the fact that the C0 channel is operated at constant power, the proposed modified dual transfer modes could be used in conjunction with the C0 channel within a cell. As a result, the overall throughput/capacity of the radio transmission system could be increased without adversely affecting the interference scenario.

Referring now to FIG. 1, shown is a block diagram of a mobile station, user equipment or wireless device 100 that may, for example, implement any of the methods described in this disclosure. It is to be understood that the wireless device 100 is shown with very specific details for example purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (Los) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with GERAN or General Packet Radio Service (GPRS) mobile data communication networks and also designed to operate with any of a variety of voice communication networks, such as Time Division Multiple Access (TDMA), Global System for Mobile Communications (GSM), etc. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. In GERAN or GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. The signals may correspond to the signals generated by the transmitters outlined in the present disclosure. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

In some implementations, the wireless device 100 is capable of operating in multiple modes such that it can engage in both CS (Circuit-Switched) as well as PS (Packet-Switched) communication, and can transition from one mode of communications to another mode of communications without loss of continuity. Other implementations are possible. In particular, the wireless device 100 may be capable of operating a CS and PS communication mode in parallel by using the conventional and/or proposed dual transfer modes.

In a particular embodiment, one or more of the above-described methods for communicating with a corresponding base station 110 are implemented by the communications subsystem 170, the microprocessor 128, the RAM 118, and the data communications module 130B, collectively appropriately configured to implement one of the methods described herein.

FIG. 2 is a block diagram of a system within which one or more of the embodiments described above may be implemented. There is a mobile station 200 in wireless communication with a network, as represented by network device or base station 210. As outlined in the context of FIG. 1, the mobile station 200 has at least one antenna 202, a transmitter 202 and a receiver 204 (which may be implemented together as a transceiver) and a controller 208. The network device or base station 210 has at least one antenna 214, a transmitter 216 and a receiver 218 (which may be implemented together as a transceiver) and a controller 220. The controllers 208, 220 may be implemented in hardware, or a combination of software and hardware, for example software running on a processor.

The base station (BS) 210 may comprise a CS system component for handling CS data traffic and a PS system component for handling PS data. The CS and PS system component may communicate with each other in order to exchange received frames which should be handled by the respective other system component. As outlined above, the CS system component may forward the frames to the PS system component which comprise PS data. Alternatively or in addition, the base station, e.g. the PS system component, may be configured to inspect a CS data stream coming from an MSC in order to identify vacant frames during DTX periods within the CS data stream. The BS, e.g. the PS system component, may be configured to insert PS data into the vacant frames as outlined in this document.

In the present patent document new dual transfer mode schemes are described which comprise the transmission of PS data during DTX periods of a CS data traffic channel. The new dual transfer mode schemes allow improving the speech quality while maintaining the number of used traffic channels. Alternatively, the number of used traffic channels may be increased while maintaining the speech quality.

The method and system described in the present document may be implemented as software, firmware and/or hardware. Certain components may e.g. be implemented as software running on a digital signal processor or microprocessor. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the method and system described in the present document are mobile stations such as mobile telephones or smartphones. On the network side, the method and system may be used in base station equipment.

In the following, different aspects of the present document are described:

1) A transmitter, e.g. a GERAN transmitter, configured to
send circuit switched data over a traffic channel to a corresponding receiver; wherein the traffic channel is segmented into a plurality of frames;
determine a vacant frame of the plurality of frames; wherein no circuit switched data is sent in the vacant frame due to discontinuous transmission; and
send packet switched data over the traffic channel using the vacant frame.

2) The transmitter of aspect 1, further configured to
set an identifier of the vacant frame to inform the corresponding receiver, e.g. a corresponding GERAN receiver, that the vacant frame comprises packet switched data.

3) The transmitter of aspect 2, wherein
the vacant frame comprises a plurality of payload symbols; and
the identifier corresponds to a subset of the payload symbols.

4) The transmitter of aspect 3, wherein
the payload symbols comprise one or more stealing symbols; and
the identifier corresponds to the one or more stealing symbols.

5) The transmitter of aspect 4, wherein the one or more stealing symbols are set to "1" for the set identifier.

6) The transmitter of any of aspects 2 to 5, wherein the set identifier makes the vacant frame appear to be a Fast Associated Control Channel frame.

7) The transmitter of any previous aspect, wherein the circuit switched data comprises audio data and/or a silence descriptor message.

8) The transmitter of any previous aspect, wherein the traffic channel is one of:
a half rate traffic channel; or
a full rate traffic channel.

9) The transmitter of any previous aspect, wherein the traffic channel is associated with a single time slot of a radio channel.

10) The transmitter of aspect 9, wherein the radio channel is modulated using one of the modulation schemes:
GMSK; or
8PSK.

11) The transmitter of any of aspects 9 to 10, wherein for a GMSK modulated radio channel, the traffic channel is encoded using one of the encoding schemes: CS-1, CS-2, CS-3, CS-4, MCS-1, MCS-2, MCS-3, MCS-4 or AMR encoding schemes; and for a 8PSK modulated radio channel, the traffic channel is encoded using one of the encoding schemes: MCS-5, MCS-6, MCS-7, MSC-8 or MCS-9.

12) The transmitter of any of aspects 9 to 11, wherein the radio channel has the Absolute Radio Frequency Channel Number C0.

13) A receiver, e.g. a GERAN receiver, configured to receive circuit switched data over a traffic channel from a corresponding transmitter, e.g. a corresponding GERAN transmitter; wherein the traffic channel is segmented into a plurality of frames;

extract an identifier comprised within a frame of the plurality of frames;

determine that the frame comprises packet switched data by using the extracted identifier; wherein the frame is a vacant frame associated with discontinuous transmission of the traffic channel.

14) The receiver of aspect 13, wherein the identifier makes the frame appear to be a Fast Associated Control Channel frame, referred to as FACCH frame.

15) The receiver of aspect 14, wherein the receiver is further configured to perform a first cyclic redundancy check after making use of a first forward error correction code to verify if the frame comprises FACCH data.

16) The receiver of aspects 14 or 15, wherein the receiver is further configured to perform a second cyclic redundancy check after making use of a second forward error correction code to verify if the frame comprises packet switched data.

17) A mobile station comprising a transmitter according to any of aspects 1 to 12; and/or a receiver according to any of aspect 13 to 16.

18) The mobile station of aspect 17, wherein the mobile station is configured to inform a corresponding base station about its capability regarding the communication of packet switched data during discontinuous transmission of circuit switched data.

19) The mobile station of aspect 18, wherein the mobile station is configured to inform the corresponding base station using a field in a Mobile Station Classmark 3 message.

20) The mobile station of aspects 18 or 19, wherein the mobile station is configured to inform the corresponding base station by means of a Channel Request Description 2 information element.

21) A base station comprising a transmitter according to any of aspects 1 to 12; and/or a receiver according to any of aspect 13 to 16.

22) The base station of aspect 21, wherein the base station is configured to inform a corresponding mobile station about its capability regarding the communication of packet switched data during discontinuous transmission of circuit switched data.

23) The base station of aspect 22, wherein the base station is configured to inform the corresponding mobile station using a DTM Assignment Command message.

24) The base station of aspects 22 or 23, wherein the base station is configured to inform the corresponding mobile station by signaling a combination of a full-rate circuit switched data traffic channel and a single-slot packet switched data traffic channel assignment.

25) The base station of any of aspects 21 to 24, further comprising a PS processing unit configured to process packet switched data; and a CS processing unit configured to process circuit switched data and configured to pass a frame comprising packet switched data to the PS processing unit.

26) The base station of any of aspects 21 to 25, wherein the base station is configured to inspect a plurality of frames received from another network element; and identify a vacant frame within the plurality of frames, wherein the vacant frame is associated with discontinuous transmission.

27) A radio interface, e.g. a radio interface for a GERAN, specifying a traffic channel for the communication of circuit switched data; wherein the traffic channel is segmented into a plurality of frames; and a vacant frame associated with discontinuous transmission is used for the communication of packet switched data.

28) A radio signal, e.g. a radio signal for a GERAN, associated with a traffic channel of a for the communication of circuit switched data; wherein the traffic channel is segmented into a plurality of frames; and a vacant frame associated with discontinuous transmission is used for the communication of packet switched data.

29) A method for transmitting circuit switched data and packet switched data over a traffic channel of a, the method comprising transmitting circuit switched data over the traffic channel; wherein the traffic channel is segmented into a plurality of frames;

determining a vacant frame of the plurality of frames; wherein no circuit switched data is sent in the vacant frame due to discontinuous transmission; and transmitting packet switched data over the traffic channel using the vacant frame.

30) A method for receiving circuit switched data and packet switched data over a traffic channel of a, the method comprising receiving circuit switched data over the traffic channel; wherein the traffic channel is segmented into a plurality of frames;

extracting an identifier comprised within a frame of the plurality of frames; and determining that the frame comprises packet switched data by using the extracted identifier; wherein the frame is a vacant frame associated with discontinuous transmission of the traffic channel.

ABBREVIATIONS

In the following, abbreviations used in the present document are listed:

| | |
|---|---|
| BS | Base Station |
| BTS | Base Transceiver Station |
| 3GPP | Third Generation Partnership Project |
| AMR | Adaptive Multi Rate |
| CS | Circuit Switched |
| DTM | Dual Transfer Mode |
| DTX | Discontinuous Transmission |
| EDGE | Enhanced Data rates for GSM Evolution |
| EFR | Enhanced Full Rate |
| EGPRS | Enhanced GPRS |
| FACCH | Fast Associated Control Channel |

-continued

| | |
|---|---|
| FDD | Frequency Division Duplex |
| FN | Frame Number |
| FR | Full Rate |
| GERAN | GSM EDGE Radio Access Network |
| GMSK | Gaussian Minimum Shift Keying |
| GPRS | General Packet Radio Service |
| GSM | Global System for Mobile communications |
| HR | Half Rate |
| MS | Mobile Station |
| MSC | Mobile Switching Centre |
| NB | Normal Burst |
| PS | Packet Switched |
| SACCH | Slow Associated Control Channel |
| SACCH/F | SACCH associated with a full rate traffic channel |
| SACCH/H | SACCH associated with a half rate traffic channel |
| SID | Silence Descriptor |
| TCH | Traffic Channel |
| TCH/F | Full rate traffic channel |
| TCH/H | Half rate traffic channel |
| TDMA | Time-Division Multiple Access |
| TSC | Training Sequence Code |
| TSG | Technical Specification Group |
| VAD | Voice Activity Detection |

The invention claimed is:

1. A transmitter configured to:
send circuit switched data over a traffic channel to a corresponding receiver, the traffic channel being segmented into a plurality of frames;
use a Fast Associated Control Channel frame for sending Fast Associated Control Channel data;
determine a vacant frame of the plurality of frames;
send packet switched data over the traffic channel using the vacant frame; and
set an identifier of the vacant frame to inform the corresponding receiver that the vacant frame comprises packet switched data,
wherein no circuit switched data is sent in the vacant frame due to discontinuous transmission,
wherein the set identifier makes the vacant frame appear to be a Fast Associated Control Channel frame,
wherein the vacant frame which is set to appear as a Fast Associated Control Channel frame does not comprise Fast Associated Control Channel data.

2. The transmitter of claim 1, wherein
the vacant frame comprises a plurality of payload symbols; and
the identifier corresponds to a subset of the payload symbols.

3. The transmitter of claim 2, wherein
the payload symbols comprise one or more stealing symbols; and
the identifier corresponds to the one or more stealing symbols.

4. The transmitter of claim 3, wherein the one or more stealing symbols are set to "1" for the set identifier.

5. The transmitter of claim 1, wherein the circuit switched data comprises at least one of audio data or a silence descriptor message.

6. The transmitter of claim 1, wherein the traffic channel is one of:
a half rate traffic channel; or
a full rate traffic channel.

7. The transmitter of claim 1, wherein the traffic channel is associated with a single time slot of a radio channel.

8. The transmitter of claim 7, wherein the radio channel is modulated using one of the following modulation schemes:
GMSK; or
8PSK.

9. The transmitter of claim 7, wherein
for a GMSK modulated radio channel, the traffic channel is encoded using one of the encoding schemes: CS-1, CS-2, CS-3, CS-4, MCS-1, MCS-2, MCS-3, MCS-4 or AMR encoding schemes; and
for a 8PSK modulated radio channel, the traffic channel is encoded using one of the encoding schemes: MCS-5, MCS-6, MCS-7, MSC-8 or MCS-9.

10. The transmitter of claim 7, wherein the radio channel has the Absolute Radio Frequency Channel Number C0.

11. A receiver configured to:
receive circuit switched data over a traffic channel from a corresponding transmitter, the traffic channel being segmented into a plurality of frames;
receive a frame of the plurality of frames over the traffic channel;
receive Fast Associated Control Channel data in a Fast Associated Control Channel frame of the plurality of frames;
extract an identifier comprised within the frame of the plurality of frames, wherein the identifier makes the frame appear to be a Fast Associated Control Channel frame;
determine that the frame comprises packet switched data by using the extracted identifier;
wherein the frame is a vacant frame associated with discontinuous transmission of the traffic channel,
wherein no circuit switched data is received in the vacant frame due to discontinuous transmission,
wherein the vacant frame which is set to appear as a Fast Associated Control Channel frame does not comprise Fast Associated Control Channel data.

12. The receiver of claim 11, wherein the receiver is further configured to: perform a first cyclic redundancy check after making use of a first forward error correction code to verify if a second frame comprises FACCH data.

13. The receiver of claim 11, wherein the receiver is further configured to: perform a second cyclic redundancy check after making use of a second forward error correction code to verify if a second frame comprises packet switched data.

14. A mobile station comprising:
a transmitter configured to:
send circuit switched data over a traffic channel to a corresponding receiver, the traffic channel is being segmented into a plurality of frames;
use a Fast Associated Control Channel frame for sending Fast Associated Control Channel data;
determine a vacant frame of the plurality of frames;
send packet switched data over the traffic channel using the vacant frame; and
set an identifier of the vacant frame to inform the corresponding receiver that the vacant frame comprises packet switched data,
wherein no circuit switched data is sent in the vacant frame due to discontinuous transmission,
wherein the set identifier makes the vacant frame appear to be a Fast Associated Control Channel frame,
wherein the vacant frame which is set to appear as a Fast Associated Control Channel frame does not comprise Fast Associated Control Channel data; and
a receiver configured to:
receive circuit switched data over a traffic channel from a corresponding transmitter, the traffic channel being segmented into a plurality of frames;
receive Fast Associated Control Channel data in a Fast Associated Control Channel frame;
receive a vacant frame over the traffic channel;

extract an identifier; and
determine that the frame comprises packet switched data by using the extracted identifier.

15. The mobile station of claim 14, wherein the mobile station is configured to inform a corresponding base station about its capability regarding the communication of packet switched data during discontinuous transmission of circuit switched data.

16. The mobile station of claim 15, wherein the mobile station is configured to inform the corresponding base station using a field in a Mobile Station Classmark 3 message.

17. The mobile station of claim 15, wherein the mobile station is configured to inform the corresponding base station by means of a Channel Request Description 2 information element.

18. A base station comprising:
a transmitter configured to:
send circuit switched data over a traffic channel to a corresponding receiver, the traffic channel being segmented into a plurality of frames;
use a Fast Associated Control Channel frame for sending Fast Associated Control Channel data;
determine a vacant frame of the plurality of frames;
send packet switched data over the traffic channel using the vacant frame; and
set an identifier of the vacant frame to inform the corresponding receiver that the vacant frame comprises packet switched data,
wherein no circuit switched data is sent in the vacant frame due to discontinuous transmission; and
a receiver configured to:
receive circuit switched data over a traffic channel from a corresponding transmitter, the traffic channel being segmented into a plurality of frames;
extract an identifier comprised within a frame of the plurality of frames, wherein the identifier makes the frame appear to be a Fast Associated Control Channel frame;
determine that the frame comprises packet switched data by using the extracted identifier;
wherein the vacant frame which is set to appear as a Fast Associated Control Channel frame does not comprise Fast Associated Control Channel data.

19. The base station of claim 18, wherein the base station is configured to inform a corresponding mobile station about its capability regarding the communication of packet switched data during discontinuous transmission of circuit switched data.

20. The base station of claim 19, wherein the base station is configured to inform the corresponding mobile station using a DTM Assignment Command message.

21. The base station of claim 19, wherein the base station is configured to inform the corresponding mobile station by signaling a combination of a full-rate circuit switched data traffic channel and a single-slot packet switched data traffic channel assignment.

22. The base station of claim 18, further comprising
a PS processing unit configured to process packet switched data; and
a CS processing unit configured to process circuit switched data and configured to pass a frame comprising packet switched data to the PS processing unit.

23. The base station of claim 18, wherein the base station is configured to
inspect a plurality of frames received from another network element; and
identify a vacant frame within the plurality of frames, wherein the vacant frame is associated with discontinuous transmission.

24. A radio interface specifying a traffic channel for the communication of circuit switched data; wherein:
the traffic channel is segmented into a plurality of frames;
a Fast Associated Control Channel frame is used to send Fast Associated Control Channel data;
a vacant frame, in which no circuit switched data is sent due to discontinuous transmission, is used for the communication of packet switched data; and
an identifier of the vacant frame makes the vacant frame appear to be a Fast Associated Control Channel frame, wherein the vacant frame which is set to appear as a Fast Associated Control Channel frame does not comprise Fast Associated Control Channel data.

25. A method for transmitting circuit switched data and packet switched data over a traffic channel, the method comprising:
transmitting circuit switched data over the traffic channel, the traffic channel being segmented into a plurality of frames;
using a Fast Associated Control Channel frame for sending Fast Associated Control Channel data;
determining a vacant frame of the plurality of frames;
sending packet switched data over the traffic channel using the vacant frame; and
setting an identifier of the vacant frame to inform the corresponding receiver that the vacant frame comprises packet switched data,
wherein no circuit switched data is sent in the vacant frame due to discontinuous transmission,
wherein the set identifier makes the vacant frame appear to be a Fast Associated Control Channel frame,
wherein the vacant frame which is set to appear as a Fast Associated Control Channel frame does not comprise Fast Associated Control Channel data.

26. A method for receiving circuit switched data and packet switched data over a traffic channel, the method comprising:
receiving circuit switched data over the traffic channel; wherein the traffic channel is segmented into a plurality of frames;
receiving a frame of the plurality of frames over the traffic channel;
receiving Fast Associated Control Channel data in a Fast Associated Control Channel frame of the plurality of frames;
extracting an identifier comprised within the second frame of the plurality of frames, wherein the identifier makes the frame appear to be a Fast Associated Control Channel frame; and
determining that the frame comprises packet switched data by using the extracted identifier; wherein the frame is a vacant frame associated with discontinuous transmission of the traffic channel,
wherein no circuit switched data is received in the vacant frame due to discontinuous transmission,
wherein the vacant frame which is set to appear as a Fast Associated Control Channel frame does not comprise Fast Associated Control Channel data.

* * * * *